July 1, 1969 C. M. QUINONES ET AL 3,453,655
STREET WATER HYDRANT GUARD
Filed Dec. 19, 1966 Sheet 1 of 2
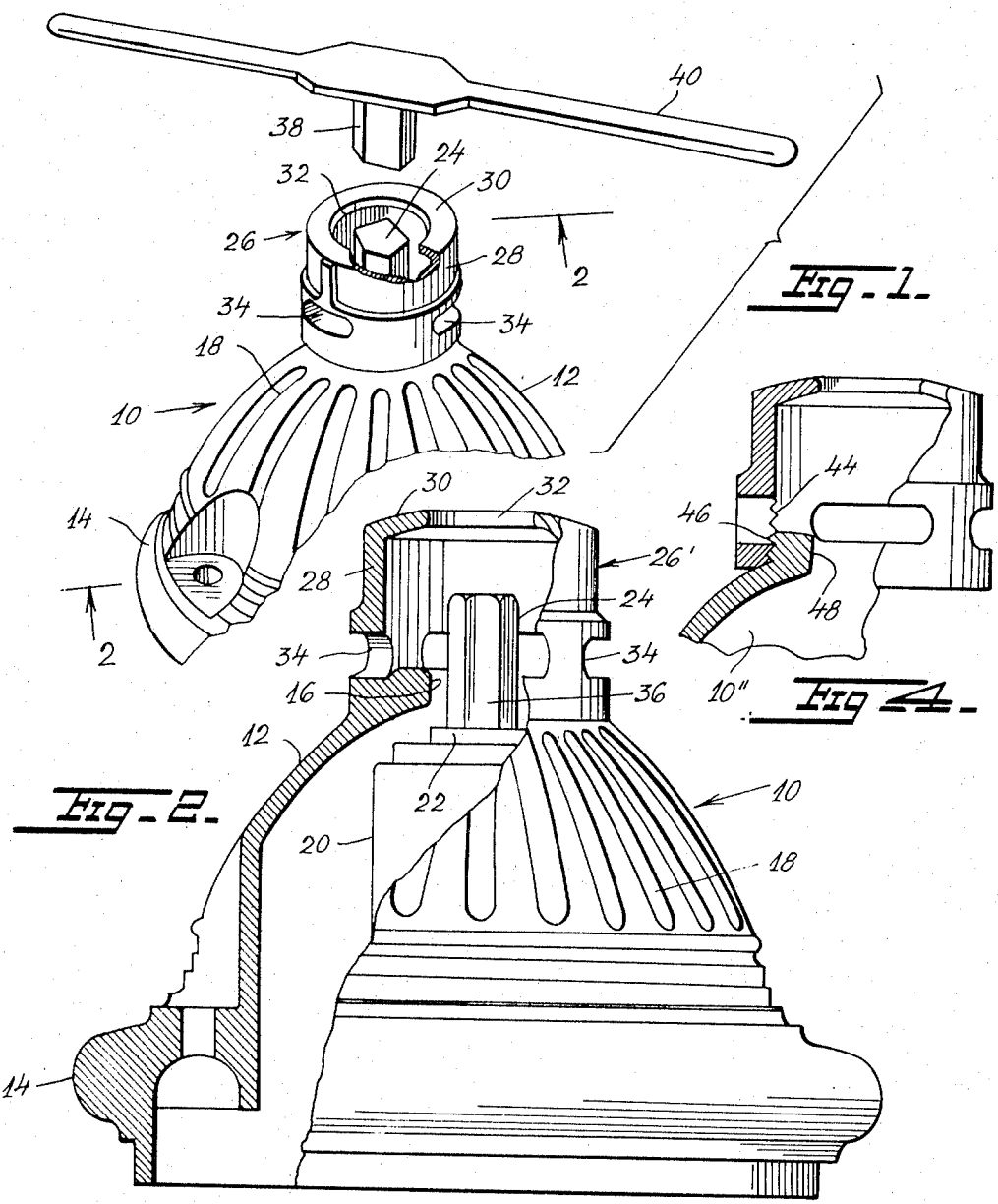
INVENTORS
Carlos M. Quinones &
Bonifacio Garcia
BY Polachek & Saulsbury
ATTORNEYS

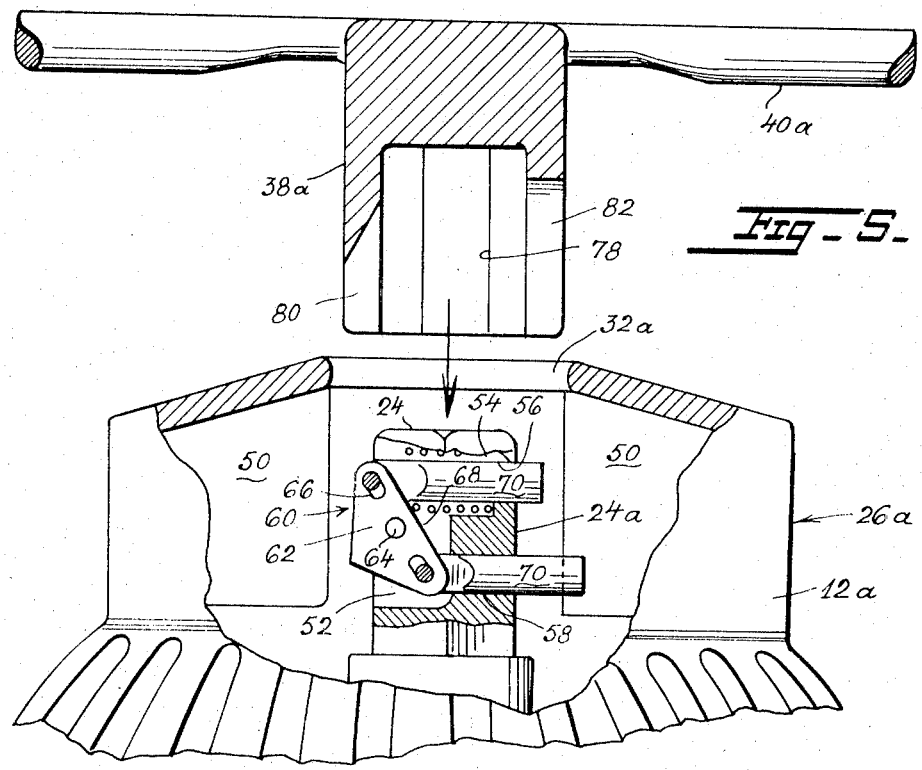
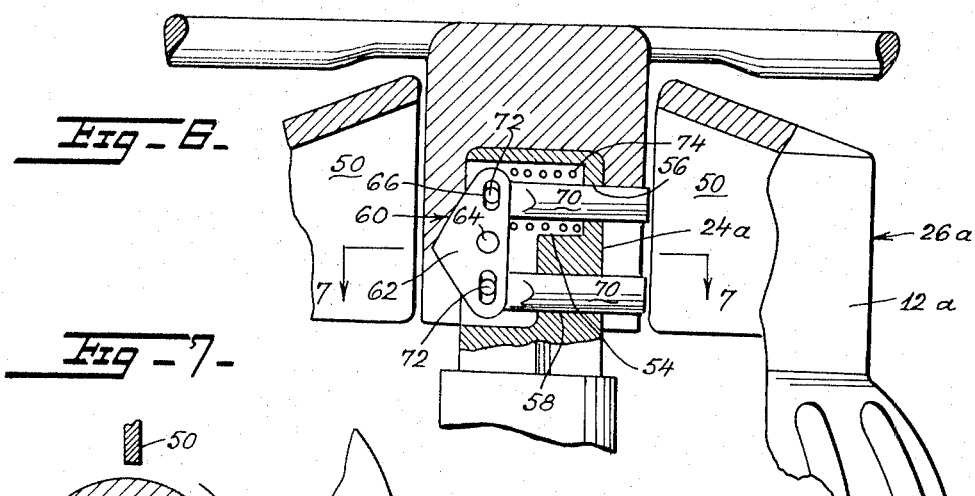
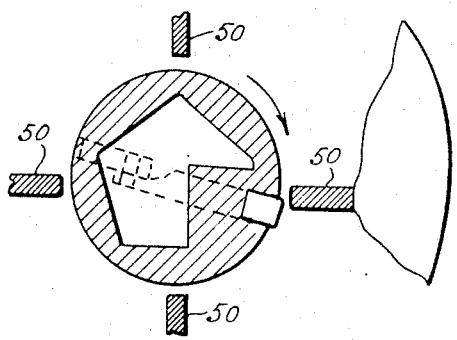

United States Patent Office 3,453,655
Patented July 1, 1969

3,453,655
STREET WATER HYDRANT GUARD
Carlos M. Quinones, 835 E. 152nd St., Bronx, N.Y. 10451, and Bonifacio Garcia, 673 Tinton Ave., Bronx, N.Y. 10455
Filed Dec. 19, 1966, Ser. No. 602,945
Int. Cl. E03b *9/02*
U.S. Cl. 137—296          4 Claims

ABSTRACT OF THE DISCLOSURE

A guard for protecting the projecting valve stem nut portion of the valve mechanism of a street water hydrant including a cylindrical housing mounted on the bonnet of the hydrant above and around the valve stem nut portion of the valve mechanism.

Summary of invention

Broadly, the invention comprises a hollow cylindrical housing mounted on the top of the bonnet of a street water hydrant around the valve stem nut portion of the valve mechanism of the hydrant, with an inlet opening at one end of the housing for a turning tool, and with spaced outlet openings in the periphery thereof at the other end, for discharging accumulated foreign matter.

Drawings

In the accompanying drawings:

FIGURE 1 is a top perspective view of a fragment of the bonnet of a street water hydrant embodying one form of the invention, a tool being shown preparatory to insertion into the device to operative position.

FIG. 2 is an enlarged vertical sectional view taken on the plane of the line 2—2 of FIG. 1.

FIG. 3 is a part sectional and part elevational view of the invention showing a first modified form of mounting thereof.

FIG. 4 is a similar view of a second modified form of mounting thereof.

FIG. 5 is a view similar to FIG. 1 of a third modification of the invention.

FIG. 6 is a somewhat similar view but showing the turning tool in operative position.

FIG. 7 is a sectional view taken on the plane of the line 7—7 of FIG. 6.

Description

Referring now in detail to the various views of the drawings, the bonnet 10 of a conventional street water hydrant is shown comprising a dome-shaped hollow body 12 with an annular bead 14 around its wide bottom end and a straight flange 14 depending from the bead. The top tapered end is formed with an opening 16. A series of shallow elongated grooves 18 are formed on the outer surface of the body 12. Suitably supported inside the bonnet there is a stuffing box 20. A cap 22 closes the top of the stuffing box, and extending inwardly of the cap 22 into the interior of the box 20 there is an elongated wrench nut portion 24. The wrench nut portion is five-sided in cross-section and extends into the upper end of the valve stem assembly. It will thus be seen that by means of the cap and wrench nut portion, a closure is formed for the stuffing box, and at the same time an operating connection is effected by means of which the operating stem of the hydrant can be operated by applying a wrench to the nut portion 24.

In accordance with the present invention, formed integrally with the top of the bonnet 10, a guard device 26 is formed integrally with the top of the bonnet 10. The guard device consists of a cylindrical hollow housing 28 open at the bottom and formed with a top wall closure 30 provided with a central inlet opening 32. The inlet opening is in line with the wrench nut portion 24. The housing extends above the top of the bonnet and above the top of the wrench nut portion. A series of elongated closed openings 34 is formed in the body of the guard device adjacent its bottom end, the openings being disposed horizontally. The guard device completely covers the opening 16 in the top of the bonnet and the wrench nut portion 24. The projecting wrench nut portion 24 has a flat top face and flat sides 36 adapted to enter a similarly shaped socket member 38 formed centrally in a cross bar or handle 40 by means of which the nut portion may be rotated for operating the valve mechanism in the stuffing box 20. By reason of this construction, only those being possessed of or provided with a proper tool will be able to operate the hydrant. Furthermore, because the guard device 26 is positioned above the bonnet and the wrench nut portion and is held in spaced relation to them, any moisture, rain, snow, dirt etc. which may enter through the opening 32 will fall out through the openings 34 in the bottom thereof.

The guard device 26 instead of being integrally formed with the bonnet 10, may be formed separately and fixedly secured to the bonnet 10' by means of a seam weld 42 as shown in the modified guard device 26' in FIG. 3; or may be formed separately and threadedly secured to the top of the bonnet 10'' by coacting threads 44 and 46 on the inner surface of the body of the guard device 26'' at the bottom thereof and on the outer neck portion 48 of the top portion of the bonnet 10'', respectively, as shown in FIG. 4.

In the modification of the invention shown in FIGS. 5 to 7, inclusive, the guard device 26*a* is formed with an imperforate body 12*a* having wings or vanes 50 extending radially from the inner surface of said body and terminating at the edge of the central opening 32*a*, four of such vanes being shown. In this form, the wrench nut portion 24*a* is formed with a slotted recess 52 on one side thereof, the recess extending from a point closely spaced from the top of the nut portion to a point remote from the bottom end thereof, a lateral extension 54 being formed in the recess at the top end thereof. A round transverse passage 56 extends through the opposite side of the body of the nut portion intersecting the extension 54 and a similar passage 58 extends parallel to the passage 56 intersecting the recess 52.

A yoke shaped latching device 60 is pivotally mounted in the recess 52. The latching device 60 comprises a triangular shaped plate 62 pivotally connected at its center to the walls of the recess 52 by means of a pivot pin 64. A pair of closed slots 66 is formed in the plate at the ends of its base portion 68. A pair of round rods 70 is pivotally connected to the plate 62 at the flattened ends thereof by means of pivot pins 72 extending from said ending through the slots 66. A compression spring 74 is sleeved around the round rod 70 that passes through the recess extension 54. The spring is seated at one end on the base of the recess extension 54 with its other end impinging against the base 68 of the triangular shaped plate 62. The round rods are of equal length and normally project an equal distance outwardly of the wrench nut portion 24*a* as best seen in FIG. 6. The rods are so dimensioned that when in normal position they terminate short of the vanes or wings 50.

In use, the latching device 60 is adapted to be pivoted around its pivot 64 to swing one of the round rods 70 outwardly of the wrench nut portion 24*a* into interlocking engagement with one of the vanes 50 as shown in FIG. 5. When in this position, the wrench nut portion 24*a* cannot be turned and it takes a special tool to turn the nut and release the interlocking rod 70. For this purpose, the invention contemplates a turning tool as shown in FIG. 5 including a socket 38a shaped in simulation of the shape of the nut 24a and an elongated handle 40a extending on each side of the socket. The body of the socket 38a is formed with a central recess 78 similar in shape to the shape of the nut 24a to receive said nut when the tool is lowered to operative position as shown in FIG. 6. The body of the socket 38a is also formed with a slot 80 on one side thereof intersecting the central recess 78 to receive the apical side of the latching plate 62, and with another slot 82 on the opposite side intersecting the central recess 78 for receiving the ends of the round rods 70, 70 when the socket is in operative position as shown in FIG. 6.

When the latching device 60 is in latching position as shown in FIG. 5, in order to release the interlock and permit turning of the wrench nut portion 24a to operate the valve mechanism of the hydrant, the tool is projected through the central opening 32a and engaged over the nut 24a, the slots 80 and 82 permitting this operation. By manually turning the handle 40a in the proper direction, the triangular shaped plate 62 will be rotated clockwise as viewed in FIG. 5 thereby swinging the interlocked round rod 70, the bottom rod, away from the vane 50 breaking the interlock and permitting continuous turning of the nut 24a, to actuate the valve mechanism in the hydrant.

We claim:

1. A street hydrant having a bonnet at the top of the standpipe portion; a stuffing box in the bonnet containing valve mechanism and a wrench nut portion connected to the valve mechanism and projecting upwardly of the bonnet, the improvement which consists of a guard device on top of the bonnet for protecting the projecting wrench nut portion, wherein the guard device includes a cylindrical hollow housing formed integrally with the top portion of the bonnet and disposed above and around the wrench nut portion spaced therefrom, said housing having vanes radiating from the inner surface thereof toward the center thereof, said wrench nut portion pivotally mounting a yoke-shaped latching device having reciprocating rods, one of said rods adapted to interlock with one of the vanes when the latching device is moved in the proper direction, said wrench nut portion and yoke device shaped to receive a turning tool.

2. The device as defined in claim 1 wherein the reciprocating rods are pivotally and slidably connected at one end to a triangular shaped plate and wherein one of the rods is spring loaded.

3. The device as defined in claim 1 wherein said housing has a central opening aligned with the wrench nut portion adapted to receive a turning tool for turning the wrench nut portion and latching device for breaking the interlock between the latching device and the vane of the housing.

4. The device as defined in claim 1 wherein the body of the wrench nut portion is slotted to receive the reciprocating rods and to receive the plate, and wherein the turning tool is formed with a central socket portion and intersecting side slots adapted to receive the body of the wrench nut portion, plate and rods of the yoke device.

References Cited

UNITED STATES PATENTS

| | | | |
|---|---|---|---|
| 795,027 | 7/1905 | Connell | 137—382.5 |
| 906,886 | 12/1908 | Jacob | 137—383 X |
| 1,795,839 | 3/1931 | Credle | 137—383 X |
| 1,541,216 | 6/1925 | Hendricks | 137—383 |
| 1,629,797 | 5/1927 | Knittel | 137—382.5 |
| 2,118,233 | 5/1938 | Ruggio | 137—296 |

FOREIGN PATENTS

| | | |
|---|---|---|
| 498,269 | 5/1930 | Germany. |
| 710,477 | 9/1941 | Germany. |
| 20,238 | 1902 | Great Britain. |
| 385,910 | 1/1933 | Great Britain. |
| 333,147 | 12/1935 | Italy. |

STANLEY N. GILREATH, *Primary Examiner.*

U.S. Cl. X.R.

137—382.5, 383